United States Patent
Jena et al.

(10) Patent No.: US 10,963,372 B1
(45) Date of Patent: Mar. 30, 2021

(54) AUTONOMOUS SELF-HEALING TEST AUTOMATION

(71) Applicant: Accenture Global Solutions Limited, Dublin (IE)

(72) Inventors: Chinmaya Ranjan Jena, Bangalore (IN); Sunder Ranganathan Nochilur, Karnataka (IN); Mahesh Venkataraman, Bangalore (IN); Michael A. Ljung, Chicago, IL (US); Jeffrey S. Wilkinson, Fishers (IN); Mallika Fernandes, Bangalore (IN); Chinmay Kumar Panda, Karnataka (IN); Akash Murumkar, Karnataka (IN); Prashant Gurunathan, Tamil Nadu (IN); Swagatika Pati, Telangana (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/901,287

(22) Filed: Jun. 15, 2020

(30) Foreign Application Priority Data

Mar. 20, 2020 (IN) .............................. 202011012131

(51) Int. Cl.
*G06F 9/44* (2018.01)
*G06F 11/36* (2006.01)
(Continued)

(52) U.S. Cl.
CPC ............ *G06F 11/3688* (2013.01); *G06F 8/38* (2013.01); *G06F 11/362* (2013.01);
(Continued)

(58) Field of Classification Search
CPC ............... G06F 11/3688; G06F 11/362; G06F 11/3676; G06F 11/3684; G06F 11/3692;
(Continued)

(56) References Cited

U.S. PATENT DOCUMENTS

| 7,165,074 B2 * | 1/2007 | Avvari | ................ | G06F 11/3676 707/999.01 |
| 7,167,870 B2 * | 1/2007 | Avvari | ................ | G06F 11/3676 707/609 |

(Continued)

OTHER PUBLICATIONS

Marcio E. Delamaro et al., Interface Mutation: An Approach for Integration Testing, Mar. 2001, [Retrieved on Jan. 28, 2021], Retrieved from the internet: <URL: https://ieeexplore.IEEE.org/stamp/stamp.jsp?tp=&arnumber=910859> 20 Pages (228-247) (Year: 2001).*

(Continued)

*Primary Examiner* — Anibal Rivera
(74) *Attorney, Agent, or Firm* — Fish & Richardson P.C.

(57) ABSTRACT

Methods, systems, and apparatus, including computer programs encoded on computer-storage media, for performing autonomous self-healing of test scripts. One example process includes the actions of recording data that reflects user interactions with multiple user interface objects of a first user interface, and, for each interaction, generating a natural language statement that reflects an intent of the interaction with an associated user interface object. The process also includes storing the natural language statements in a test script, autonomously self-healing the test script for execution on a second user interface, and executing the autonomously self-healed test script on a second user interface.

20 Claims, 4 Drawing Sheets

(51) Int. Cl.
*G06F 9/48* (2006.01)
*G06F 8/38* (2018.01)
*G06F 8/35* (2018.01)
*G06F 9/455* (2018.01)
*G06F 11/34* (2006.01)
*G06F 8/34* (2018.01)
*G06F 9/451* (2018.01)

(52) U.S. Cl.
CPC ...... *G06F 11/3676* (2013.01); *G06F 11/3684* (2013.01); *G06F 11/3692* (2013.01); *G06F 8/34* (2013.01); *G06F 8/35* (2013.01); *G06F 9/451* (2018.02); *G06F 9/455* (2013.01); *G06F 9/485* (2013.01); *G06F 11/34* (2013.01); *G06F 11/36* (2013.01)

(58) Field of Classification Search
CPC . G06F 11/36; G06F 11/34; G06F 8/38; G06F 8/30; G06F 8/35; G06F 8/34; G06F 9/455; G06F 9/451; G06F 9/46; G06F 9/485
See application file for complete search history.

(56) References Cited

U.S. PATENT DOCUMENTS

| | | | | |
|---|---|---|---|---|
| 8,171,460 | B2* | 5/2012 | Pizzoli | G06F 9/451 |
| | | | | 717/136 |
| 8,347,267 | B2* | 1/2013 | Givoni | G06F 11/3688 |
| | | | | 717/124 |
| 8,549,479 | B2* | 10/2013 | Chawakula | H04L 61/302 |
| | | | | 717/124 |
| 10,114,738 | B2* | 10/2018 | Dsouza | G06F 11/3684 |
| 10,691,584 | B2* | 6/2020 | Talukdar | G06F 16/86 |
| 2003/0149934 | A1* | 8/2003 | Worden | G06F 16/84 |
| | | | | 715/239 |
| 2008/0270982 | A1* | 10/2008 | Cypher | G06F 8/34 |
| | | | | 717/110 |
| 2008/0292265 | A1* | 11/2008 | Worthen | G11B 27/34 |
| | | | | 386/282 |
| 2011/0196853 | A1* | 8/2011 | Bigham | G06F 8/35 |
| | | | | 707/706 |
| 2011/0276944 | A1* | 11/2011 | Bergman | G06F 11/3684 |
| | | | | 717/124 |
| 2012/0072823 | A1* | 3/2012 | Lau | G06F 8/38 |
| | | | | 715/234 |
| 2013/0055268 | A1* | 2/2013 | Amershi | G06F 9/46 |
| | | | | 718/101 |
| 2013/0095864 | A1* | 4/2013 | Marovets | H04L 51/08 |
| | | | | 455/466 |
| 2013/0097586 | A1* | 4/2013 | Chandra | G06F 11/3684 |
| | | | | 717/124 |
| 2014/0032467 | A1* | 1/2014 | Reddy | G06N 3/008 |
| | | | | 706/46 |
| 2016/0127539 | A1* | 5/2016 | Sharma | H04M 15/08 |
| | | | | 379/112.09 |
| 2018/0267887 | A1* | 9/2018 | Dsouza | G06F 11/3688 |
| 2018/0349256 | A1* | 12/2018 | Fong | G06F 40/35 |
| 2020/0089524 | A1* | 3/2020 | Nelson | G06F 9/485 |
| 2020/0092178 | A1* | 3/2020 | Nelson | H04L 41/145 |
| 2020/0104241 | A1* | 4/2020 | Talukdar | G06F 40/284 |
| 2020/0110792 | A1* | 4/2020 | Tsabba | G10L 17/00 |

OTHER PUBLICATIONS

David M. Hilbert et al., Extracting Usability Information form User Interface Events, Dec. 2000, [Retrieved on Jan. 28, 2021], Retrieved from the internet: <URL: https://dl.acm.org/doi/pdf/10.1145/371578.371593> 38 Pages (384-421) (Year: 2000).*

* cited by examiner

FIG. 1A

EXECUTION WINDOW — 150

| | | |
|---|---|---|
| ENTER "FIRST NAME" AS "BOB" 152 | ✓ | Ⓐ — 154 |
| ENTER "LAST NAME" AS "SMITH" 156 | ✓ | Ⓑ — 158 |
| ENTER "BIRTHDAY" AS "03/15/74" <br> ↳ SELF HEALED TO BIRTHDAY — 164    160 | ✓ | Ⓒ — 162 |
| CLICK ON NEXT    166 | ↻ | Ⓓ — 168 |

ENTER NEW CONTACT FORM 2.0 — 120

- 122 — FIRST NAME: [ BOB ] Ⓐ
- 124 — LAST NAME: [ SMITH ] Ⓑ   172   170
- 126 — GENDER: [ ▼ ]
- 128 — BIRTHDAY: [ 3 ▼ ] [ 15 ▼ ] [ 74 ▼ ] Ⓒ
- 174
- [ NEXT ] 130

AUTONOMOUS SELF-HEALING TEST AUTOMATION

CROSS-REFERENCE TO RELATED APPLICATION

This application claims priority to Indian Patent Application No. 202011012131, filed on Mar. 20, 2020, the entirety of which is hereby incorporated by reference.

FIELD

This specification generally relates to software application test automation.

SUMMARY

Software applications are designed to accommodate a multitude of transactions, where each transaction often requires the performance of a significant number of functions. Testing of software applications may include creating test cases based on requirements and then executing the test cases through, for example, a test script to detect defects. Test cases may be automated using commercial and open source tools to reduce execution time. Once automated, these test cases can be executed repeatedly and frequently, which adds to the amount of testing coverage for the respective application. However, effective and efficient management of such suites of test cases is both time consuming and effort intensive.

As software applications grow in complexity in order to address heightened user experience expectations, automation of the testing of these applications has become more challenging as well. Frequent automation test script failures result in low automation productivity, diminishing the return on investment (ROI) for automated test scripting tools.

SUMMARY

Implementations of the present specification are generally directed to test script self-healing using natural language processing techniques, that autonomously generate test scripts, and that adapt to user interface changes during text execution by identifying and addressing dynamic object changes in real time.

One general implementation includes actions of recording data that reflects user interactions with multiple user interface objects of a first user interface, and, for each interaction, generating a natural language statement that reflects an intent of the interaction with an associated user interface object. The actions also include storing the natural language statements in a test script, autonomously self-healing the test script for execution on a second user interface, and executing the autonomously self-healed test script on a second user interface.

Implementations may include one or more of the following features. The first user interface may be a legacy user interface associated with a particular function of a software application, and the second user interface may be an updated user interface associated with the particular function of the software application. Autonomously self-healing the test script may include comparing the natural language statement that is stored in the test script with a natural language statement that is associated with a dynamic object by a custom library. The dynamic object may include an object that exists in the second user interface but not the first user interface. The dynamic object may be an object that exists in the second user interface and that replaces a corresponding object in the first user interface. The actions may include generating an execution interface while executing the autonomously self-healed test script, the execution interface identifying any interaction that was self-healed. The execution interface may include a prompt for receiving approval of any interaction that was autonomously self-healed.

Other implementations of any of the above aspects include corresponding systems, apparatus, and/or computer programs that are configured to perform the operations of the methods. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more computers, and one or more computer memory devices coupled to the one or more computers having instructions stored thereon which, when executed by the one or more computers, cause the one or more computers to perform operations in accordance with implementations of the methods provided herein.

These implementations may provide for several important technical advantages. For instance, autonomous, self-healing test scripts require little or no manual modification effort to execute. Self-healed test scripts can address issues associated with scripts that are not truly bugs in a software program, allowing finite troubleshooting resources to be prioritized in favor of more substantial concerns. Execution of test-scripts can occur very quickly, even if self-healing is involved, and human monitoring can be avoided or even eliminated.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF THE DRAWINGS

Like reference numbers and designations in the various drawings indicate like elements.

DETAILED DESCRIPTION

Figure 1A:
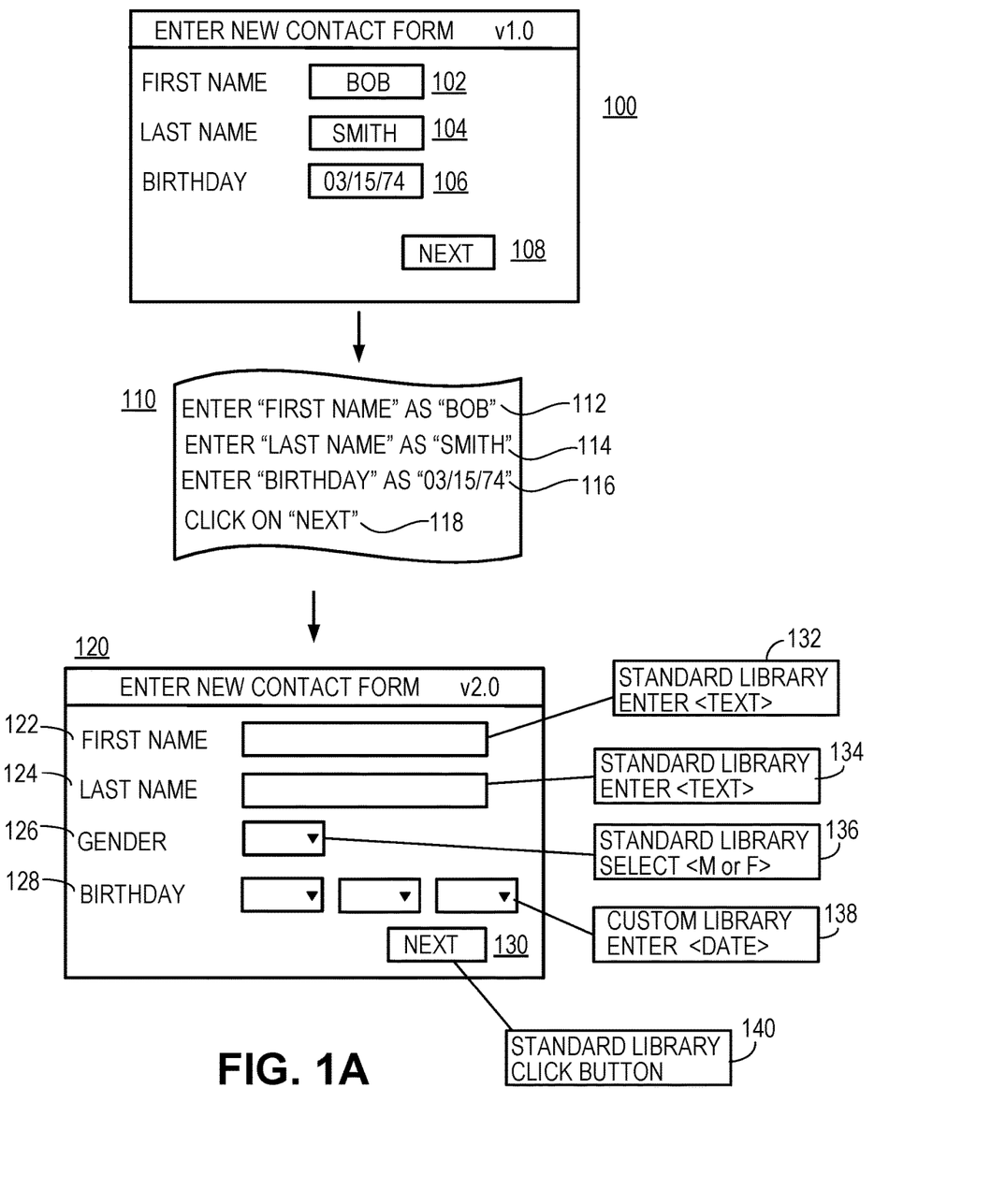
FIGS. 1A and 1B illustrate the generation and autonomous self-healing of a test script using natural language processing.
Figure 1B:
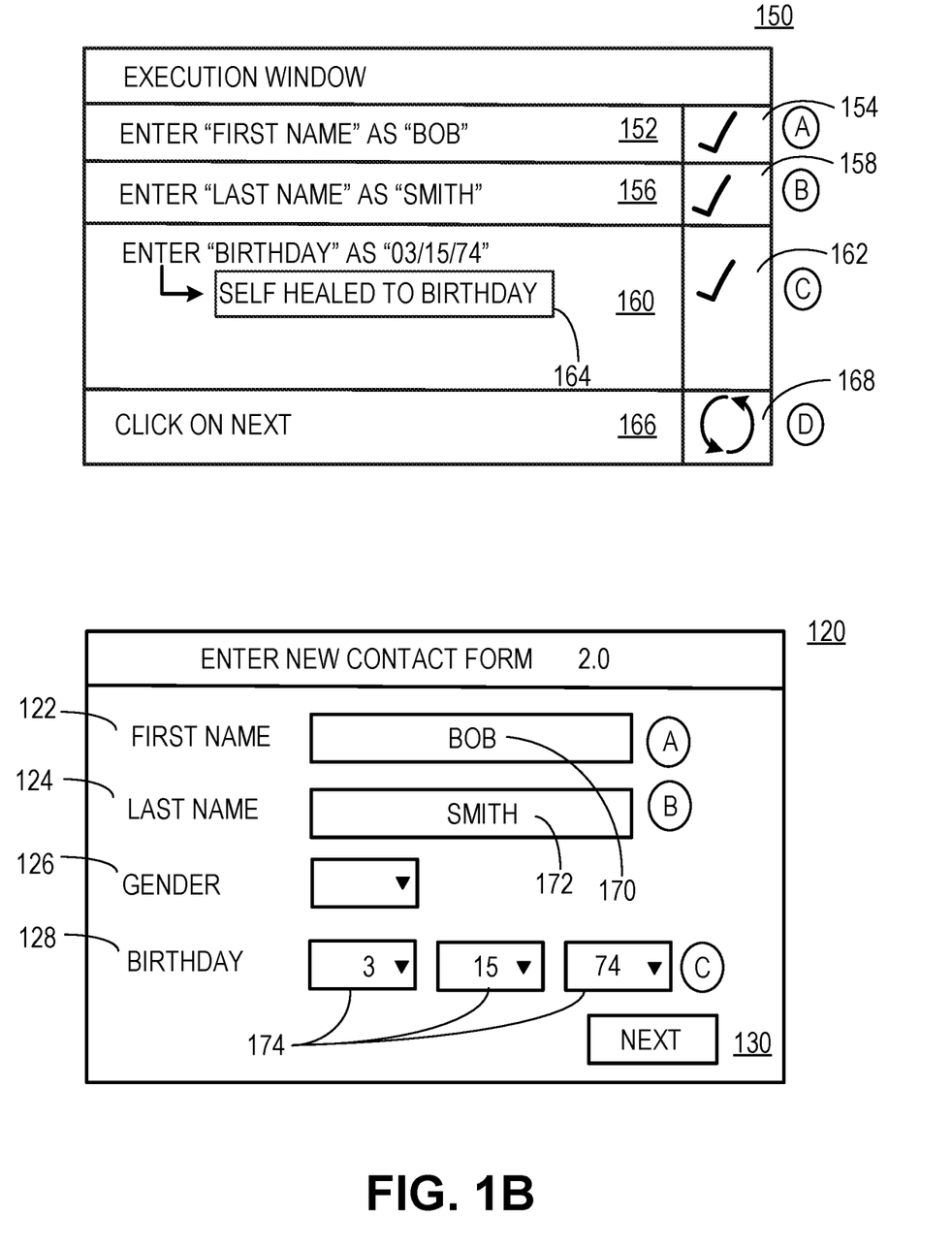

FIGS. 1A and 1B illustrate the generation and self-healing of a test script using natural language processing. In general, and in addition to or instead of simply recording characteristics of objects that a user interacts with when recording a test script, an enhanced, self-healing test script generator described by this specification also records syntax-free, natural language statements that describe the intents behind each interaction. When a legacy user interface is updated, these intents can be used by an enhanced, self-healing test script execution engine to map objects in the legacy user interface to objects in the updated user interface, reducing the chances of a test script failure, and eliminating the need for manual interventions.

FIG. 1A illustrates a legacy version of a user interface 100 that is associated with an example software application, where, in this example, the legacy version of the user interface 100 is associated with functionality for entering information about a new contact. The legacy version of the user interface 100 includes a text field 102 for entering a first name of a contact as a free text data entry, a text field 104 for entering a last name of a contact as a free text data entry, a text field 106 for entering a value representing a date as free text, and a "next" control 108 for advancing to a subsequent or next user interface of the example software application.

After initiating a recording operation, a user enters the text "Bob" in text field 102, enters the text "Smith" in text field 104, enters the text "03/15/74," representing the date Mar. 15, 1974, into text field 106, and then selects the "next" control 108 to advance to a next user interface. The user then ceases recording.

During the recording process, the enhanced, self-healing test script generator stores various characteristics of the objects that the user has interacted with. For example, when entering the text "Bob" in text field 102, the test script generator may store an identifier attribute of the text field, a tag associated with the text field 102, the data entered into the text field 102, e.g., the text "Bob," a field type associated with the text field 102, a name attribute associated with the text field 102, e.g., "First Name," an absolute XPath associated with the text field 102, a relative XPath associated with the text field 102, a display name associated with the text field 102, or other attributes like a title, placeholder, alt information, src information, ng model information, position information, image thumbnail information, or any other information about the text field 102.

Notably, however, and in addition to or instead of simply storing these basic characteristics, the enhanced, autonomous, self-healing test script generator described by this specification can also or instead record syntax-free, natural language statements that describe each interaction, e.g., in the form of an intent statement, in test script 110. For example, for the entry of the text "Bob" in text field 102, the enhanced, self-healing test script generator may store the entry 112 ("Enter 'First Name' as 'Bob'").

For the entry of the text "Smith"" in text field 104, the enhanced, autonomous self-healing test script generator may store the entry 114 ("Enter 'Last Name' as 'Smith'"). For the entry of the text "Mar. 15, 1974" into text field 106, the enhanced self-healing test script generator may store the entry 116 ("Enter 'Birthday' as 'Mar. 15, 1974'"). For the selection of the "next" control 108, the enhanced self-healing test script generator may store the entry 118 ("Click on Next").

The generation of natural language statements can be based on a determination of whether an object is a standard object or a custom object. For standard objects, such as a field, link, button, dropdown, or other standard control, functions (e.g., Selenium functions) can ascribe a verb, such as "enter" for text fields or "click" for buttons, and an object, such as the data entered into a text field or a name associated with a button. For custom objects, such as application specific dropdowns, date pickers, search fields, images, navigation bars, or scroll elements, custom functions developed by an automation specialist can be applied to ascribe a verb and an object to interactions with the custom objects.

FIG. 1A also illustrated illustrates an updated version of the user interface 120. Similar to the legacy version of the user interface 100, the updated version of the user interface 120 includes a text field 122 for performing software functionality associated with entering a first name of a contact as a free text data entry, a text field 124 for entering a last name of a contact as a free text data entry, and a "next" control 130 for advancing to a next user interface of the example software application. In contrast to the legacy version of the user interface 100, the updated version of the user interface 120 includes a new dropdown field 126 for selecting a gender of a contact from among multiple predefined choices, and includes a custom date picker object 128 that includes three dropdown sub-fields for entering a three date values representing a month, day and year, selected from among multiple predefined choices.

Absent the syntax-free, natural language statements that describe the intents behind each desired interaction, a legacy test script execution engine might simply rely on stored characteristics of objects within a user interface to determine where and how to execute an interaction. Where, as in the updated version of the user interface 120, objects are replaced or added between the time when a script is recorded and when it is executed, such a legacy test script execution engine might generate false positives and fail, requiring manual troubleshooting.

When encountering the updated version of the user interface 120, an enhanced self-healing test script execution engine may use the natural language statements that are stored in a test script in order to map objects in the legacy version of the user interface 100 to objects in the updated version of the user interface 120, thereby reducing the chance of a test script failure.

In more detail, the enhanced, self-healing test script execution engine can scan the updated version of the user interface 120 to identify that the text field 122 is associated with a standard library 132 that ascribes the verb "enter" and input text as an object in a generated natural language statement, to identify that the text field 124 is associated with a standard library 134 that ascribes the verb "enter" and input text as an object in a generated natural language statement, to identify that the dropdown field 126 is associated with a standard library 136 that ascribes the verb "select" and one of two predefined choices ("M" or "F") as an object in a generated natural language statement, that the custom date picker object 128 is associated with a custom library 138 that ascribes the verb "enter" and a date composed of the values of the three dropdown subfields as an object in a generated natural language statement, and that the "next" control 120 is associated with a standard library 140 that ascribes the verb "click" and the name of the button as an object in a generated natural language statement.

Turning to FIG. 1B, which illustrates an execution interface 150 associated with the enhanced, autonomous, self-healing test script execution engine during stages (A) to (D), during which the engine reproduces the interactions that were stored in connection with the legacy version of the user interface 100 while interacting with the updated version of the user interface 120, by self-healing the test script 110.

In stage (A), the enhanced, self-healing test script execution engine can display a representation 152 of the natural language statement of the entry 112 in the execution interface 150, and can compare either the basic characteristics of the text field 122 to the basic characteristics of the text field 102, and/or can compare the natural language statement of the entry 112 that was generated in association with the interaction with text field 102 with the natural language statement that is associated with the text field 122 by the standard library 132, to determine that the interaction associated with the entry 112 is to be performed in connection with the text field 122.

Comparison of either the basic characteristics of the text fields or the natural language statements associated with the text fields are both viable approaches to identify this match, as this field has not been substantially updated between the legacy version of the user interface 100 and the updated version of the user interface 120. After performing the interaction associated with the entry 112, the execution interface 150 can be updated to display an indication 154 of the successful performance of this operation, which in this example interface is a checkmark. Text 170 ("Bob") is entered into the text field 122.

In stage (B), the enhanced, self-healing test script execution engine can display a representation 156 of the natural language statement of the entry 114 in the execution interface 150, and can compare either the basic characteristics of the text field 124 to the basic characteristics of the text field 104, and/or can compare the natural language statement of the entry 114 that was generated in association with the interaction with text field 104 with the natural language statement that is associated with the text field 124 by the standard library 134, to determine that the interaction associated with the entry 114 is to be performed in connection with the text field 124.

Again, in this situation, comparison of either the basic characteristics of the text fields or the natural language statements associated with the text fields are both viable approaches to identifying this match, as this field has not been substantially updated between the legacy version of the user interface 100 and the updated version of the user interface 120. After performing the interaction associated with the entry 114, the execution interface 150 can be updated to display an indication 154 of the successful performance of this operation, which in this example interface is a checkmark. Text 172 ("Smith") is entered into the text field 124.

In stage (C), the enhanced, self-healing test script execution engine can display a representation 156 of the natural language statement of the entry 116 in the execution interface 150. Were the test script execution engine to evaluate only the basic characteristic of the text field 106 in determining where and how to execute the interaction associated with the entry 116, the execution engine may have difficulty choosing a field or control to input the date associated with the entry 116. For example, relying on position characteristics, an execution engine might select the dropdown field 126 (associated with a gender) as the proper field for entering the date, while, relying on title or name characteristics, an execution engine might select the custom date picker object 128, or another object, or no object, as the proper field for entering the data.

By comparing the natural language statement associated with the entry 116 that was generated in association with the interaction with text field 106 with the natural language statement that is associated with the dropdown field 126 by the standard library 134 and the natural language statement that is associated with the custom date picker object 128 by the custom library 138, the enhanced, self-healing execution engine can determine, with high confidence, that the interaction associated with the entry 116 is to be performed in connection with the custom date picker object 128, even though the custom date picker object 128 did not exist in the legacy version of the user interface 100.

More specifically, the natural language statement associated with the entry 116 includes the verb "enter," and includes a date as an object, as does the natural language statement ascribed by the custom library 138, while the natural language statement ascribed by the standard library for the dropdown field 126 includes "select" (not "enter") as an object, and predefined choices (not a date) as an object. Said another way, the natural language statements of the entry 116 and the custom library 138 are similar, while the natural language statements of the entry 116 and the standard library 136 are not.

After performing the interaction associated with the entry 116, the execution interface 150 can be updated to display an indication 162 of the successful performance of this operation, which in this example interface is a checkmark, as well as an indication 164 that self-healing occurred during the execution of this operation. A date 174 ("Mar. 15, 1974") is entered into the custom date picker object 128.

In stage (D), the enhanced, self-healing test script execution engine can display a representation 166 of the natural language statement of the entry 118 in the execution interface 150, and can compare either the basic characteristics of the "next" control 130 to the basic characteristics of the next control 108, and/or can compare the natural language statement of the entry 118 that was generated in association with the interaction with "next" control 108 with the natural language statement that is associated with the "next" control 130 by the standard library 140, to determine that the interaction associated with the entry 118 is to be performed in connection with the "next" control 1304.

Again, in this situation, comparison of either the basic characteristics of the controls or the natural language statements associated with the controls are both viable approaches to identifying this match, as this control has not been substantially updated between the legacy version of the user interface 100 and the updated version of the user interface 120. While performing the interaction associated with the entry 118, the execution interface 150 can be updated to display an indication 168 of the ongoing performance of this operation, which in this example interface is a circular pair of spinning arrows. Because the self-healing occurred autonomously, no human interventions were required to map objects.

Figure 2:
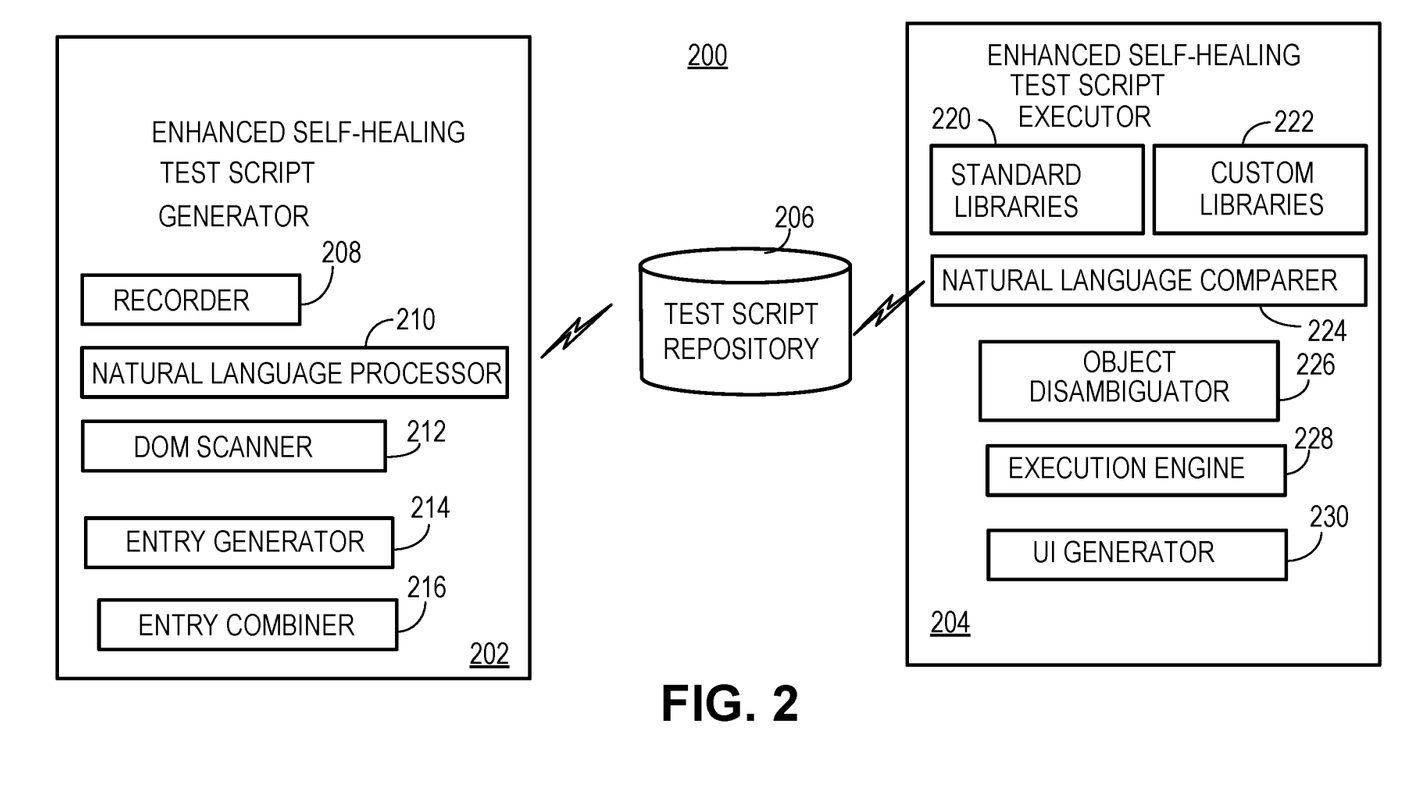
FIG. 2 is a system diagram of an enhanced, autonomous, self-healing test script generation and execution system

FIG. 2 is system diagram of an enhanced, autonomous, self-healing test script generation and execution system 200. Briefly, the enhanced, self-healing test script generation and execution system 200 includes an enhanced, self-healing test script generator 202, an enhanced, self-healing test script executor 204, and a test script repository 206.

The enhanced, self-healing test script generator 202 includes a recorder 208 for detecting user interactions with a user interface and for initiating the generation of test script entries, a natural language processor (NLP) 210 for generating natural language statements for inclusion in test script entries, a document object model (DOM) scanner 212 for determining characteristics of objects that are included in a user interface, an entry generator 214 for generating test script entries that include, at a minimum, a natural language statement that reflect an intent associated with a single user interaction, and an entry combiner 216 for combining sequences of test script entries that are output by the entry generator 214, to generate complete test scripts.

In more detail, the recorder 208 performs a scan of the DOM to identify all objects in a user interface. In addition to an object ID, if available, the recorder gathers additional information about characteristics of objects, such as object name or XPath. In a multi-window scenario, interfaces are scanned by refreshing a browser by the recorder 208 in a step-by-step fashion. Metadata about the various windows built and may be visualized in a generation user interface, to indicate characteristics about the objects in each window. This metadata may be stored in JSON format.

Information that is captured by the recorder 208 may include object information, user actions, data requirements, environmental details and expected results, which is all stored in a single JSON file by the entry combiner 216, and which serves as the automated test script.

In a multi-frame scenario, from metadata about each window, the various frames in an interface are identified. Objects can be selected from each frame, and user actions can be recorded by selecting an appropriate frame while interacting with various objects.

For each object identified by the recorder, object information from the application user interface is obtained and, for each object, it is determined whether it is a standard object or a custom object. Such a decision can be based on actions associated with the object, tags associated with the object, scripts, e.g., Java scripts, that are associated with the object, the DOM structure, and a determination of whether the custom object exists in a repository of custom objects. Such a repository can be automatically built and maintained based on scans that are performed on applications under development.

The natural language processor 210 generates a natural language statement, or description of an interaction with an object. Natural language statements can include, for example, statements such as "Launch application 'example.com'," "Enter 'username' as 'xyz'," "Enter 'password' as 'abc'," or "Click on the 'login'," etc.

Test scripts which each include natural language statements that reflect intents associated with multiple user interactions are stored in the test script repository 206.

The enhanced, self-healing test script executor 204 includes or has access to standard libraries 220 that ascribe natural language phrases, e.g., verbs and objects, to standard user interface objects, and custom libraries 222 that ascribe natural language phrases to custom user interface objects. Custom objects may include, for example, date pickers, search fields, images, navigation bars, or scroll elements.

A natural language comparer 224 compares and determines the similarity of natural language statements, and an object disambiguator 226 selects an object of a user interface to perform a test script entry based at least on a comparison of natural language statements.

The object disambiguator 226 may select an object based on the comparison of natural language statements after failing to select an object using some other way. For example, object IDs may be the first characteristic that is compared, then other properties such as object name, description or XPath could be checked if the object IDs do not match. Assuming none of these characteristics match, or sufficiently match, the comparison of natural language statements can be performed. For custom objects that are used in cloud-based applications, XPaths are often not able to yield object position or location information, so a combination of natural language statement comparisons and comparisons of Java scripts may be used to identify matching objects.

The object disambiguator 226 may select an object based on a confidence value that results from a comparison satisfying a threshold. For example, an updated DOM hierarchy can be compared to a legacy DOM hierarchy to score a similarity of parent-child relationships in each hierarchy, and a confidence score can be assigned based on the similarity.

A confidence score can similarly be assigned when performing a comparison of natural language statements associated with test script entries. For example, a parts of speech tagger can identify verbs and objects or object types from natural language statements. The first element of a confidence score can be based on the uniqueness of the object $C_u$.

For example, if the natural language statement includes a verb that is associated with a scroll bar object and only one scroll bar object exists in the user interface, then the uniqueness of the object is high, i.e. $C_u=1$. On the contrary, if the natural language statement includes a verb that is associated with a text box and the user interface includes five text boxes, then the uniqueness of the object is low, i.e. $C_u=0.2$.

While recording the test script, the DOM structure and the relative position of every object is also recorded. In this regard, for every object, the parent and the child(ren) objects in the DOM hierarchy are determined, and information about these relationships is stored. In performing autonomous self-healing, after a changed or modified object has been identified, the updated DOM structure can be compared with the legacy DOM Structure to check if a candidate object's relative position is intact or similar to the legacy position, i.e., if the candidate object has similar parent and child(ren) object types. This positional element of the confidence score is denoted a $C_P$.

Element $C_P$ can be expressed as follows:

$$C_P=\text{Object position Index}(I_{OP}+\text{Parent Object Index } I_{PO}+\text{Parent Object Type Index } I_{POT}+$$

$$\text{Child Object Index } I_{CO}+\text{Child Object Type Index } I_{COT})$$

Object position Index Top is determined to be a value of 1 if the self-healed object is in the same position in the legacy user interface and the updated user interface. If the object has changed position, then Object position Index Top is expressed as follows:

$$\text{Object position Index } I_{OP}=(\text{Number of Positions moved by the Object})/(\text{Total number of Objects in the latest DOM Structure})$$

Parent Object Index $I_{PO}$ is determined to have a value of 1 if the parent object of the self-healed object is the same in the DOM of the legacy user interface and the DOM of the updated user interface. If the parent object is different, then the tag, description and relative position of the old and new parent objects are compared to determine the value of this Index.

Parent Object Type Index $I_{POT}$ is determined to have a value of 1 if the object type of the parent object of the self-healed object is the same before and after self-healing. Otherwise, Parent Object Type Index $I_{POT}$ is calculated based on the similarity of the object type. For example, dropdown fields and radio button fields are similar in functionality, and checkbox controls and multi-value picker controls are similar, and both pairs of would be assigned a relatively high index value. By comparison, text box fields and scroll bar controls are quite dissimilar and would be assigned a lower index value.

The Child Object Index $I_{CO}$ is calculated similarly to the Parent Object Index, however child(ren) objects are considered instead of parent objects Child Object Type Index $I_{COT}$ is also calculated similarly to the Parent Object Index, except, again, the child(ren) objects are considered instead of parent objects.

The overall position-related confidence score $C_P$ may be calculated using various, tunable or empirically determined weighting parameters. For example, $C_P$ may be calculated as follows:

$$C_P=(0.6*I_{OP})+0.1(I_{PO}+I_{POT})+0.1(I_{CO}+I_{COT})$$

The overall confidence score C may also be calculated using various tunable or empirically determined weighting parameters. For example, C may be calculated as follows:

$$C=0.5*C_u+0.5*C_P$$

Using these weightings, the object disambiguator 226 can select a candidate object of an updated version of a user interface as corresponding to an object of a legacy version of a user interface if the confidence score C is greater than 0.8, reflecting a high confidence level. A confidence score C of between 0.5 and 0.8 is considered medium confidence level, and a confidence score below 0.5 is considered a low confidence level.

Once a script has been autonomously self-healed, it is executed by the execution engine 228. If the self-healing was accurate, the test case would normally execute successfully. If the test case fails due to an incorrect object mapping, the UI generator 230 can generate an indication on the execution interface that highlights the error, e.g., in red. Actions taken by automation engineers to make manual corrections can be used as feedback by the enhanced, self-healing test script executor 204 for use in future scenarios.

An execution engine 228 executes test script entries on selected objects, and a user interface generator 230 that generates an execution interface for displaying the status of execution of a test script, including, optionally, whether autonomous self-healing has been performed. The enhanced, self-healing test script executor may have access to standard libraries 220 via function calls (e.g., Selenium function calls).

The operation of the enhanced, self-healing test script generation and execution system 200 is described in more detail below, in connection with FIG. 3.

Figure 3:
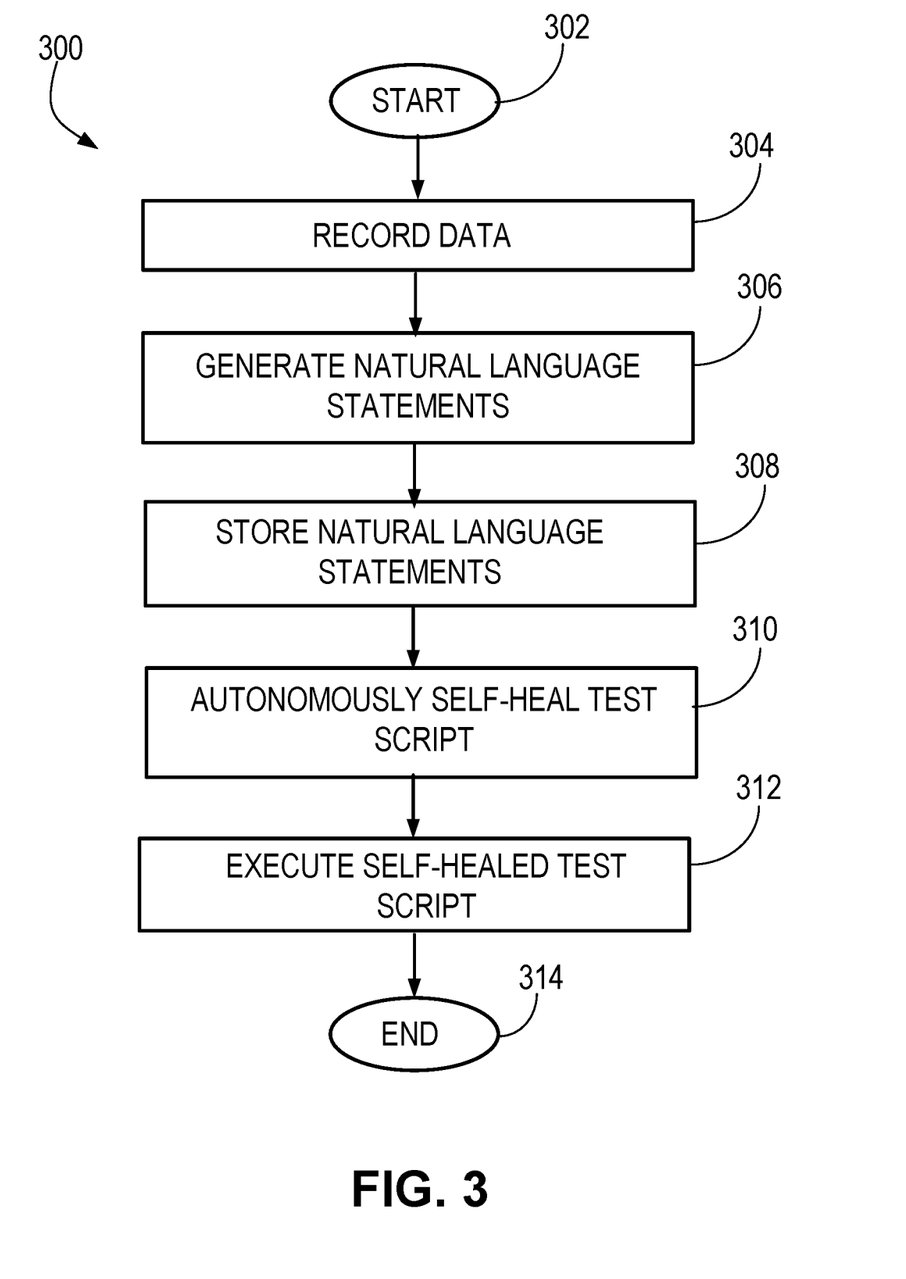
FIG. 3 is a flowchart that illustrates a process for executing autonomously self-healed test scripts.

FIG. 3 is a flowchart that illustrates a process 300 for executing autonomously self-healed test scripts.

Briefly, the process 300 includes operations of recording data that reflects user interactions with multiple user interface objects of a first user interface, and, for each interaction, generating a natural language statement that reflects an intent of the interaction with an associated user interface object. The process also includes the additional operations of storing the natural language statements in a test script, autonomously self-healing the test script to execute on a second user interface, and executing the autonomously self-healed test script on a second user interface.

In more detail, when process 300 begins (302), data that reflects user interactions with multiple user interface objects of a first user interface is recorded (304). The user interface may include a highly responsive, adaptive and customized web page that is generated based on user profile information, as well as on past user actions. The user interface may include complex combinations of iFrames, may make extensive use of iFrames, and may include nested iFrames.

The user interface objects may be created dynamic objects, or may have object properties, e.g., an object identifier, that is created dynamically, which would traditionally increase the difficulty of mapping interactions between legacy and updated versions of the user interface. Actions that are associated with dynamic objects, such as a "click" action or an "edit" action may be ascribed by custom libraries that are generated by software developers and may therefore not be standard to a type of objects.

For each interaction, a natural language statement that reflects an intent of the interaction with an associated user interface object is generated (306). Because the process 300 involves the use of natural language statements instead of, for example, simply using object IDs, test scripts can be applied to new or updated user interfaces that use dynamic object IDs, or to user interfaces that are built dynamically based on past user interactions, or to user interfaces that are complex, e.g., through the usage of iFrames and tables and images. Additionally, custom actions can be mapped in a non-traditional manner to some objects, for example by associating a push or submit action with a high-resolution image instead of a button object.

The natural language statements are stored in a test script (308), and the test script is autonomously self-healed for execution on a second user interface (310). Finally, the autonomously self-healed test script is executed on a second user interface (312), thereby ending the process 300 (314).

By performing self-healing on scripts where object properties have changed, a significant reduction in engineering effort may be realized, and the need to ensure that the latest object properties are reflected in scripts may be eliminated.

In summary, the enhanced, autonomous, self-healing test script generation and execution system addresses many of the primary problems associated with automating UI-based testing, which are not addressed by any existing test automation tools. In experiments, the techniques provided by this system have exhibited significantly faster automation script generation, a significant reduction in automation script maintenance efforts, and significantly faster automation script execution.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A computer-implemented method comprising:
    recording data that reflects user interactions with multiple user interface objects of a first user interface;
    while recording the data that reflects the user interactions with the multiple user interface objects of the first user interface, and for each interaction with an associated user interface object of the first user interface that is included in the recorded data, automatically generating a natural language statement that reflects an intent of the interaction with an associated user interface object, then storing, for each user interaction, both (i) the natural language statement that was automatically generated for the interaction and (ii) data characterizing the user interaction, as an entry for the user interaction in a test script;

autonomously self-healing the test script for execution on a second user interface, comprising:
for an entry of the test script that is associated with a particular user interface object that has been updated in the second user interface, and upon determining that the data characterizing the user interaction that is stored in the entry has failed to identify a particular candidate user interface object of the second user interface from among two or more candidate user interface objects of the second user interface, selecting, from among the two or more candidate user interface objects of the second user interface, the particular candidate user interface object of the second user interface that is ascribed an action that best matches an action included in the natural language statement of the entry; and executing the autonomously self-healed test script on a second user interface, comprising executing the natural language statement associated with the particular user interface object in connection with the selected user interface object of the second user interface.

2. The method of claim 1, wherein the first user interface comprises a legacy user interface associated with a particular function of a software application, and wherein the second user interface comprises an updated user interface associated with the particular function of the software application.

3. The method of claim 1, wherein autonomously self-healing the test script comprises comparing the natural language statement that is stored in the test script with a natural language statement that is associated with a dynamic object by a custom library.

4. The method of claim 3, wherein the dynamic object comprises an object that exists in the second user interface but not the first user interface.

5. The method of claim 3, wherein the dynamic object comprises an object that exists in the second user interface and that replaces a corresponding object in the first user interface.

6. The method of claim 1, comprising generating an execution interface while executing the autonomously self-healed test script, the execution interface identifying any interaction that was self-healed.

7. The method of claim 1, wherein the execution interface comprises a prompt for receiving approval of any interaction that was autonomously self-healed.

8. A non-transitory, computer-readable medium storing one or more instructions executable by a computer processor to perform operations comprising:
recording data that reflects user interactions with multiple user interface objects of a first user interface;
while recording the data that reflects the user interactions with the multiple user interface objects of the first user interface, and for each interaction with an associated user interface object of the first user interface that is included in the recorded data, automatically generating a natural language statement that reflects an intent of the interaction with an associated user interface object, then storing, for each user interaction, both (i) the natural language statement that was automatically generated for the interaction and (ii) data characterizing the user interaction, as an entry for the user interaction in a test script;

autonomously self-healing the test script for execution on a second user interface, comprising:
for an entry of the test script that is associated with a particular user interface object that has been updated in the second user interface, and upon determining that the data characterizing the user interaction that is stored in the entry has failed to identify a particular candidate user interface object of the second user interface from among two or more candidate user interface objects of the second user interface, selecting, from among the two or more candidate user interface objects of the second user interface, the particular candidate user interface object of the second user interface that is ascribed an action that best matches an action included in the natural language statement of the entry; and executing the autonomously self-healed test script on a second user interface, comprising executing the natural language statement associated with the particular user interface object in connection with the selected user interface object of the second user interface.

9. The medium of claim 8, wherein the first user interface comprises a legacy user interface associated with a particular function of a software application, and wherein the second user interface comprises an updated user interface associated with the particular function of the software application.

10. The medium of claim 8, wherein autonomously self-healing the test script comprises comparing the natural language statement that is stored in the test script with a natural language statement that is associated with a dynamic object by a custom library.

11. The medium of claim 10, wherein the dynamic object comprises an object that exists in the second user interface but not the first user interface.

12. The medium of claim 10, wherein the dynamic object comprises an object that exists in the second user interface and that replaces a corresponding object in the first user interface.

13. The medium of claim 8, wherein the operations comprise generating an execution interface while executing the autonomously self-healed test script, the execution interface identifying any interaction that was self-healed.

14. The medium of claim 8, wherein the execution interface comprises a prompt for receiving approval of any interaction that was autonomously self-healed.

15. A system comprising:
one or more computers; and
one or more computer memory devices interoperably coupled with the one or more computers storing one or more instructions that, when executed by the one or more computers, perform one or more operations comprising:
recording data that reflects user interactions with multiple user interface objects of a first user interface;
while recording the data that reflects the user interactions with the multiple user interface objects of the first user interface, and for each interaction with an associated user interface object of the first user interface that is included in the recorded data, automatically generating a natural language statement that reflects an intent of the interaction with an associated user interface object, then storing, for each user interaction, both (i) the natural language statement that was automatically generated for the interaction and (ii) data characterizing the user interaction, as an entry for the user interaction in a test script;

autonomously self-healing the test script for execution on a second user interface, comprising:

for an entry of the test script that is associated with a particular user interface object that has been updated in the second user interface, and upon determining that the data characterizing the user interaction that is stored in the entry has failed to identify a particular candidate user interface object of the second user interface from among two or more candidate user interface objects of the second user interface, selecting, from among the two or more candidate user interface objects of the second user interface, the particular candidate user interface object of the second user interface whose natural language statement that is ascribed an action that best matches an action included in the natural language statement of the entry; and executing the autonomously self-healed test script on a second user interface, comprising executing the natural language statement associated with the particular user interface object in connection with the selected user interface object of the second user interface.

16. The system of claim 15, wherein the first user interface comprises a legacy user interface associated with a particular function of a software application, and wherein the second user interface comprises an updated user interface associated with the particular function of the software application.

17. The system of claim 15, wherein autonomously self-healing the test script comprises comparing the natural language statement that is stored in the test script with a natural language statement that is associated with a dynamic object by a custom library.

18. The system of claim 17, wherein the dynamic object comprises an object that exists in the second user interface but not the first user interface.

19. The system of claim 17, wherein the dynamic object comprises an object that exists in the second user interface and that replaces a corresponding object in the first user interface.

20. The system of claim 15, wherein the operations comprise generating an execution interface while executing the autonomously self-healed test script, the execution interface identifying any interaction that was self-healed.

* * * * *

UNITED STATES PATENT AND TRADEMARK OFFICE
CERTIFICATE OF CORRECTION

PATENT NO. : 10,963,372 B1  
APPLICATION NO. : 16/901287  
DATED : March 30, 2021  
INVENTOR(S) : Chinmaya Ranjan Jena et al.

Page 1 of 1

It is certified that error appears in the above-identified patent and that said Letters Patent is hereby corrected as shown below:

On the Title Page

Item (72), Column 1 (Inventors), Line 6, delete "(IN);" and insert -- IN (US); --, therefor.

In the Claims

In Claim 15, Column 15, Line 19, after "interface" delete "whose natural language statement".

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*